Dec. 8, 1953          E. KRETSCHMAR          2,661,512
ELECTRICAL INSECT KILLER WITH FIRE PREVENTING MEANS
Filed July 7, 1950          2 Sheets-Sheet 1
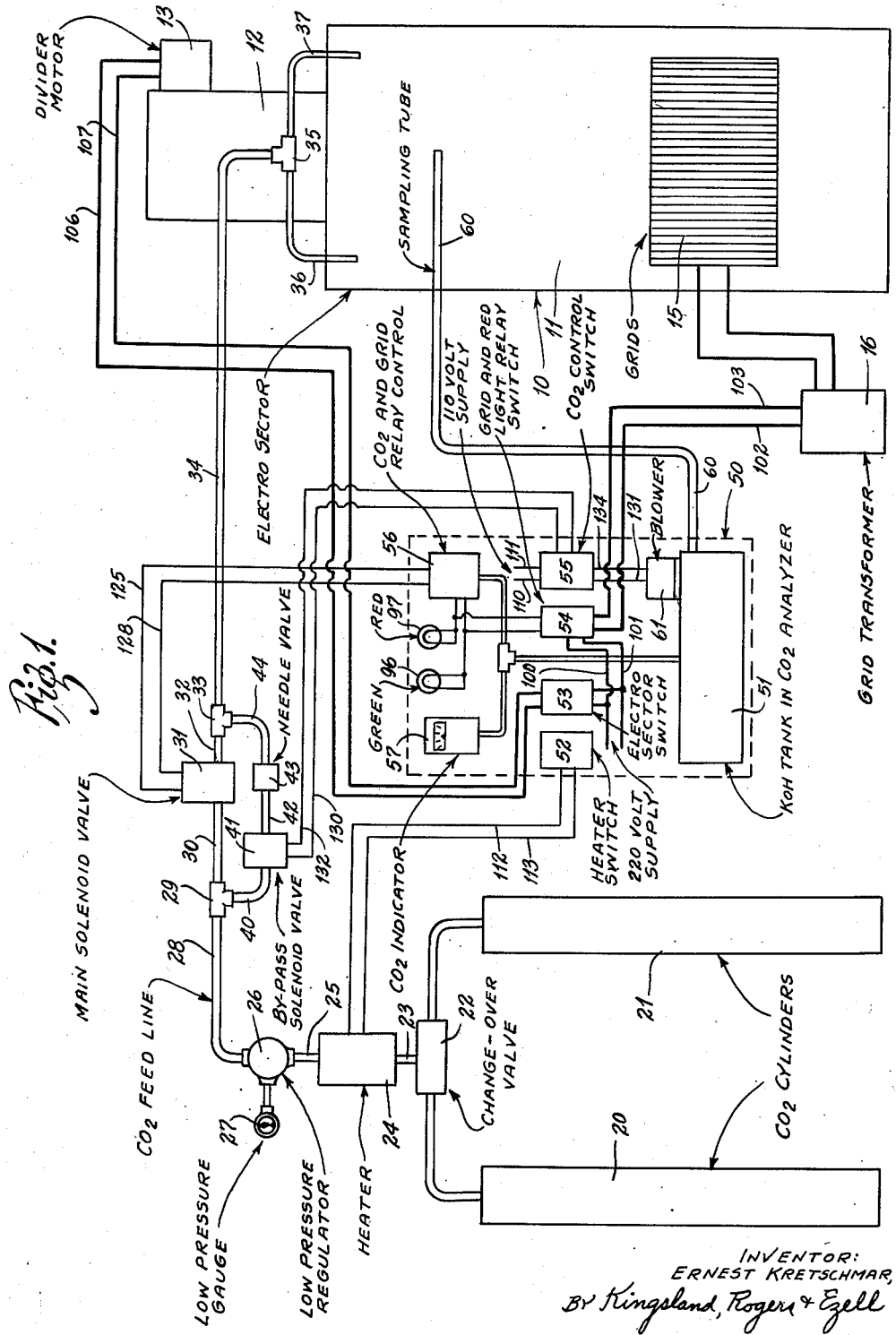
INVENTOR:
ERNEST KRETSCHMAR,
By Kingsland, Rogers & Ezell
ATTORNEYS

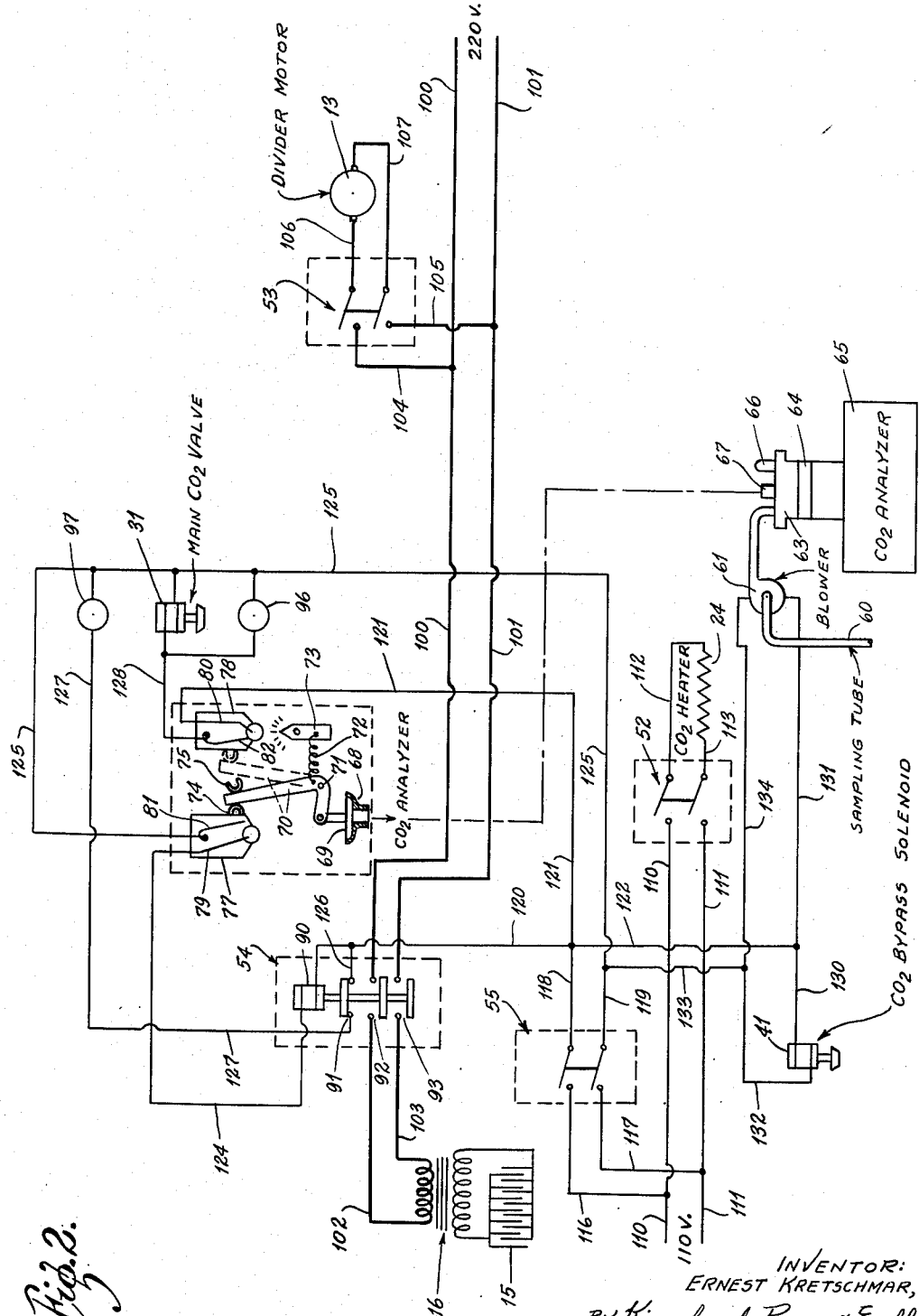

Patented Dec. 8, 1953

2,661,512

UNITED STATES PATENT OFFICE 2,661,512

ELECTRICAL INSECT KILLER WITH FIRE PREVENTING MEANS

Ernest Kretschmar, Clayton, Mo.

Application July 7, 1950, Serial No. 172,567

10 Claims. (Cl. 21—102)

This invention relates to a device for regulating the atmosphere that is particularly adapted for use in connection with electric insect killers, such as that shown in Stone Patent No. 2,373,428, of April 10, 1945. It will of course be understood that it is adapted for use in many other connections in which it is desirable or necessary to maintain a particular ratio or relative density between components of the atmosphere within an enclosure. But in connection with electrical devices of the type mentioned, there is a fire hazard if normal atmosphere is present surrounding the electrostatic device, since sparks may occur and could cause explosion; so that the present apparatus has especial value in automatically regulating the ratio of an inert component of the atmosphere in an insect killer.

In the particular device referred to, there is a grid consisting of a large number of spaced conductors, across which grain or the like may be caused to flow. The grain is non-conductive, but any insects or similar living matter that short-circuit between adjacent and oppositely charged grid elements will conduct electricity, and the current is such as to electrocute the insects.

Preferably, such insect killing apparatus is used in a constantly moving grain stream. In the present invention, the insect electrocutor is illustrated as having grids and having a divider motor, which is a conventional piece of apparatus designed to feed a properly even stream of grain to the grids. The divider motor, when operating, feeds the grain thus properly to one end of the grid or the grids. These grids may be arranged so that they slope downwardly, with the result that the grain descends by gravity from the upper ends of the grids to the lower ends, during which insect electrocution may take place.

While in the electrocuting device of the Stone patent the insects were electrocuted, it was discovered that there could be some fire hazard because of the presence of grain dust and the like in a normal atmosphere within the confined space of the housing of the equipment. The present invention is designed to eliminate the fire hazard by providing an atmosphere sufficiently heavy in an inert gas component such as carbon dioxide, to render the confined atmosphere inert to such sparking.

The present invention not only maintains the atmosphere inert by the delivery of carbon dioxide into the housing of the electrocuting apparatus, but it also maintains that atmosphere within a safely inert range automatically. In addition, if for any unexpected reason the atmosphere should drop to a dangerous range of carbon dioxide, the present apparatus automatically deenergizes the electrostatic grids so that no explosion can take place.

Furthermore, the present invention has indicators thereon that will indicate its various conditions. Thus, when the carbon dioxide is being automatically supplied to the housing, a suitable visual indication thereof will be given. When the principal supply of carbon dioxide is cut off, an indication thereof will result. If the dangerous condition of atmosphere exists within the apparatus, this will be indicated by another signal.

Additionally, the equipment is completely deenergized when the control mechanism is entirely shut off, as by manual action.

Another feature of the present invention is that there will always be a certain minimum supply of carbon dioxide to the chamber, accompanied by an intermittent supply of a larger volume of carbon doxide thereto as needed. This results in a more even modulation of the atmosphere within the electrocuting chamber, and also a more economical operating cycle.

There is pressure regulation of the carbon dioxide delivered to the electrocuting chamber, and in addition the control includes temperature regulating means that prevent freezing adjacent to the pressure regulating devices.

Other features of the invention will appear from the description to follow.

In the drawings:

Figure 1 is a somewhat diagrammatic view of the instrumentalities involved in the present apparatus; and Figure 2 is a wiring diagram of the apparatus.

It is thought unnecessary to describe the electrocuting apparatus in detail since the Stone patent illustrates an embodiment thereof. In Figure 1, it is shown generally at 10, there being a housing 11 therefor. There is a grain feeding means 12 at the top of the housing 11, the feeding of grain into which is regulated by a divider motor 13.

Within the housing, there is an electrostatic grid device 15. One or more of these may be used. It is arranged on a slope and it consists of a plurality of electrically separated and alternately charged conductor elements, as diagrammed in Figure 2. These grid elements are spaced together a distance suitable to produce conduction between adjacent grid elements whenever an insect of the type normally found in the grain or other material being treated is presented between adjacent grids. After leaving the sloping grids 15, the grain descends into other processing elements of the grain treating system. The grid is charged a suitably high potential from a grid transformer 16.

The present invention operates to maintain an atmosphere within the housing 11 that is inert so that explosion cannot take place therein should sparks occur from the grid action. For example, a safe atmosphere can be one that is above 34% $CO_2$. Consequently the present control apparatus may be set to assure a density of 34% $CO_2$ at all times when the grids are energized, and to deenergize the grids should the $CO_2$ density drop below 34%. Furthermore, the control acts to prevent the wastage of carbon dioxide by limiting the maximum density thereof. This consists of a control apparatus that will shut off a main $CO_2$ valve when the density within the housing 11 reaches a value somewhat higher than 34%, such as 36%. This main supply of carbon dioxide is cut on again should the density descend to 35%. Thus, in short, the equipment will prevent energization of the grid until the carbon dioxide density within the housing 11 is at a safe value such as 34%, and will thereafter maintain the density of carbon dioxide between 35% and 36%.

The control apparatus operates to regulate a gas supply means, regulating delivery of gas from a suitable source, which is here shown as two carbon dioxide cylinders 20 and 21. These are both connected into a change-over valve 22, which is of the automatic type commercially available so that it automatically shifts from one cylinder to the other as the first is emptied.

The change-over valve discharges into a line 23 that connects into a carbon dioxide heater 24. This heater is designed to heat the carbon dioxide prior to its entry into a pressure regulator, so that it will be above a temperature at which freezing may occur at the regulator.

The heater discharges into a pipe 25 that connects into a low pressure regulator 26. This pressure regulator has a suitable pressure gauge 27, and is set to a proper pressure such as six to eight pounds, this having been found satisfactory. From the pressure regulator 26, a carbon dioxide feed line 28 leads into a T 29. From this T, a main carbon dioxide feed line 30 leads into a main solenoid valve 31. From this main solenoid valve 31, the carbon dioxide feed line continues at 32 to a T 33. From this T, the carbon dioxide feed line continues at 34 to a T 35, from which two branches 36 and 37 open into the top of the housing. It is preferable to admit the carbon dioxide at the upper part of the housing 11, as, being heavier than air, it will descend and thereby will produce a proper atmosphere throughout the housing 11.

There is a bypass around the main solenoid valve 31 in the carbon dioxide feed line. This bypass extends from the T 29 by a pipe 40 that connects into a bypass solenoid valve 41. From this bypass solenoid valve, the bypass line continues at 42 into a needle valve 43, and from this, by a pipe 44, back to the T 33. As will appear, the bypass solenoid valve is open whenever the apparatus is operable at all. By this arrangement, the needle valve 43 can provide a regulated minimum supply of carbon dioxide to the housing 11 at all times, regardless of whether the main solenoid valve 31 is closed. The supply of a minimum amount of carbon dioxide to the housing means that the atmosphere will always be partially charged with carbon dioxide, and will preferably be charged with the maximum amount that can practically be used without overcharging under certain conditions of operation of the electrocuting apparatus 10. By this means, the main solenoid valve can operate intermittently and is required to modulate the density of carbon dioxide only within a relatively narrow range.

The foregoing parts of the apparatus are under an automatic control that is based upon a carbon dioxide analyzer, and which includes certain other switches. This control is shown in its principal elements as mounted on a single panel 50 shown in dashed lines at the middle part of Figure 1. On this panel, there is mounted a carbon dioxide analyzer, generally indicated at 51. In addition, there are four control switches 52, 53, 54 and 55 arranged on the panel. While the details of these switches will be considered more hereafter, it may be mentioned at this time that the switches 52, 53 and 55 are manual switches, such as double-pole, single-throw switches, whereas the switch 54 is a compound relay switch.

Also on the panel, there is a carbon dioxide and grid relay control device 56, and there is a carbon dioxide indicator 57.

A sampling tube 60 extends into the housing 11 of the electrocuting device 10. It connects into a small blower or fan device 61, by which gas is drawn through the tube 60 and delivered into the carbon dioxide analyzer 51. The blower 61 is electrically operated, and a reference to Figure 2 will show that it discharges the atmosphere into a head 63 on the analyzer. This head is above a porous resistance plate 64, and below the latter there is a container 65 that constitutes a carbon dioxide absorption tank filled, for example, with potassium hydroxide.

The head 63 of the analyzer 65 has an atmosphere vent 66. It also has a pipe 67 that leads into a diaphragm chamber 68 that is closed by a diaphragm 69. This diaphragm actuates a bell crank switch control lever 70 that is pivoted at 71 on a suitable mount. A spring 72, with a tension adjuster 73, normally draws the lever 70 in such direction as to lift the diaphragm 69. The outer end of the lever 70 has two magnets 74 and 75 thereon.

Adjacent the head of the lever 70 are two stationary mercury switches 77 and 78. Each of these tubes contains a portion of mercury in a suitable well at its bottom. Each also has a fixed conductor leading down into the mercury. Thus the switch 77 has a fixed conductor 79 and the switch 78 has a fixed conductor 80. Each switch also has a magnetically responsive movable switch lever. The switch 77 has such a lever 81, whereas the switch 78 has such a blade 82.

When the switch operating lever 70 is toward the switch 78, as illustrated in Figure 2, the magnetically responsive blade 82 will be pulled out of the mercury so that the switch is opened. However, the blade 81 of the switch 77 will be released so that its end enters the mercury and closes circuit with the fixed switch element 79. When the switch arm 70 is in neutral position between the two switches 77 and 78, they both will be closed.

In this type of analyzer, increase in density of carbon dioxide within the housing 11 (and hence in the analyzer 51) results in an increase in pressure in the line 67, and hence in the diaphragm chamber 68. When this operating pressure is below a minimum value, the switch lever 70 will remain in its full line position adjacent the switch 77, holding the same open, and permitting the switch 78 to close. As the density of carbon dioxide increases above this minimum, the diaphragm will rise, and move the switch member 70 to neutral position, wherein both switches 77 and 78 are closed. As the density reaches a maximum, the member 70 moves to the dashed line position of Figure 2, wherein it opens the switch 78, the switch 77 remaining closed.

Thereafter, as the density of carbon dioxide descends, the lever 70 will be moved away from the switch 78 to a neutral position, permitting the switch 78 to close while the switch 77 remains closed. If the density of carbon dioxide descends further to a certain minimum, the blade 70 will move to the left in Figure 2 until the magnet 74 opens the switch 77 again.

The relay 54 previously mentioned is mounted upon the panel 50. It includes a coil 90 and a three-way switch arrangement 91, 92 and 93. It will be seen that, when the coil 90 is deenergized, the switch 91 is closed, whereas the switches 92 and 93 are opened. When the coil 90 is energized, the switch 91 is opened, but the switches 92 and 93 are closed.

The panel board also includes two signals, here shown as a green light 96 and a red light 97.

The wiring of the foregoing includes a 110-volt or low voltage network and a 220-volt or high voltage network.

The high voltage network includes two high voltage lines 100 and 101. The line 100 leads to the switch 92, and the line 101 leads to the switch 93. The other sides of the two respective switches are connected by lines 102 and 103 to the grid transformer 16, from which the outlet lines lead oppositely to the elements of the grid 15.

The switch 53 and divider motor 13 are connected across the high voltage lines 100 and 101. Thus, branches 104 and 105 lead to the switch 53, and the divider motor 13 is connected to the outlet sides of this switch 53 by lines 106 and 107.

The low voltage network includes two 110-volt lines, 110 and 111. The line 110 leads directly to one side of the manual switch 52, and the line 111 leads to the other side thereof. The outlet side of the switch 52 is connected by lines 112 and 113 to the opposite ends of the carbon dioxide heater 24.

Additionally, there are branch lines 116 and 117 connected to the 110-volt leads 110 and 111, respectively, that lead to the switch 55 which is the primary control switch of the apparatus. The other side of this manual switch has lines 118 and 119 connected therefrom. The line 118 branches into a line 120, a line 121 and a line 122. The line 120 leads into the coil 90, from the other side of which a line 124 leads to the fixed terminals 79 of the switch 77. The movable terminal 81 of the switch 77 is connected by a lead 125 that is a return lead connecting into the wire 119.

The branch wire 120 also has a connection 126 that leads to the relay switch 91. From the other side of this switch, a wire 127 extends to the red light 97 and thence to the return lead 125.

The wire 121 connects into the fixed terminal 80 of the switch 78. The other movable terminal 82 of the switch 78 is connected by a wire 128 that leads, in parallel, to the main carbon dioxide solenoid valve 31 and to the green light 96, and thence into the return wire 125.

The branch 122 from the switch lead 118 connects down and branches at 130 and 131. The branch 130 leads through the coil of the carbon dioxide bypass solenoid 41, from which a wire 132 connects to a wire 133 that leads to the wire 119, and back through the switch 55. The branch 131 of the wire 122 leads through the electric motor of the fan or blower 61, from which another wire 134 leads back to the wire 133 and thence to the switch 55.

Operation

At the start of any operation of the electrocuting apparatus 10, there will be grain up to the divider 12. The connections will be made as have been indicated. A supply of carbon dioxide will be attached to the change-over valve. The pressure regulator 26 will be set for the desired pressure. The needle valve 43 will be set to maintain the maximum amount of carbon dioxide in the carbon dioxide feed line that cannot overload the housing 11. The carbon dioxide relay control will have its adjustment 73 set to determine its operating pressures that will maintain the desired density of carbon dioxide within the housing 11. The several switches will be in the positions shown, all the manual switches 52, 53 and 55 being open, the relay 54 being deenergized to the position illustrated. As the density of carbon dioxide at a start is very low, the diaphragm 69 will be low and the switch arm 70 will be as shown in full lines, in which position its magnet 74 attracts the blade 81 to open the switch 77. Meanwhile, the blade 82 being released, the switch 78 will be closed.

An inspection of the wiring diagram will show that all of the operating mechanisms are deenergized and the apparatus is at rest. As both solenoid valves 31 and 41 are closed, the carbon dioxide supply is entirely cut off, so that the valves on the tanks 20 and 21 may be left open, particularly if the machine is not to be left inoperative for long periods.

To start the machine, the switch 52 is closed, this energizing the carbon dioxide heater. Then the switch 55 is closed. When the switch 55 is closed, a circuit is closed from the 110-volt lines through this switch to energize the lines 118 and 119, the latter being for purposes of description considered as the return line. As soon as the switch 55 is closed, therefore, a circuit is completed from the line 118 through the line 122, whence it branches at 130 and 131 to energize the carbon dioxide bypass solenoid and the blower on the analyzer. The circuit to the former branches through the line 130, the coil of the valve 41 and the lines 132 and 133 back to the return line 119. The blower is energized by the branch 131 through the blower motor and back by the line 134 and the line 133 to the return line 119.

The bypass solenoid, being thus opened, permits carbon dioxide to flow from one of the cylinders 20 and 21 through the change-over valve 22, the pipe 23, through the heater 24, thence by way of the pipe 25, the low pressure regulator 26 into the feed line 28. The main solenoid 31 is at this time closed, but the bypass connection extends through the pipe 40, the now open bypass solenoid valve 41, the pipe 42, the properly adjusted needle valve 43, the pipe 44, the pipe 45 and the pipes 36 and 37 into the top of the housing 11. At the same time, the blower draws samples of atmosphere through the sampling tube 60 and discharges the same into the head of the $CO_2$ analyzer. As the carbon dioxide content is relatively low in this atmosphere, the carbon dioxide will be substantially all absorbed in the potassium hydroxide in the tank 65, and substantially no pressure will build up at the outset in the head and in the pipe 67 leading to the diaphragm chamber 68. Hence the diaphragm 69 will be in a lower position, and the switch arm 70 will be in the position indicated in full lines in Figure 2.

The closure of the switch 55 also energizes a circuit through the branch line 121 that extends upwardly through the now closed switch 78 and out therefrom through the line 128 to the coil of the main carbon dioxide solenoid valve 31, the green light 96, and back to the return lines 125 and 119. Consequently, when the switch 55 is closed, the green light will burn and the main solenoid valve 31 will open. This will cause a substantial discharge of carbon dioxide through the carbon dioxide feed line and into the top of the housing 11. The fact that the main carbon dioxide valve 31 is open is thus indicated by the presence of the green light.

At this time, the branch 120, leading from the switch 55, is energized because the relay switch 91 is closed (its coil being deenergized). This branch extends from the switch 91 through the red light 97 and back by return lines 125 and 119, thus causing the red light to burn, indicating an unsafe atmosphere in the housing 11.

As the density of carbon dioxide within the housing 11 increases, this will be indicated by the analyzer 51. It will be reflected in a gradual increase in pressure within the diaphragm chamber 68, and hence a lifting of the diaphragm 69. This will be followed by a shifting of the switch control arm 70 away from the switch 77. When the density of carbon dioxide within the housing 11 reaches a certain safe value, such as 34%, the switch arm 70 will move to a neutral position between the two switches 77 and 78 so that both may remain closed.

When the switch 77 closes, it causes energization of the coil 90 of the relay 54. When the relay coil 93 is energized, the switch 91 is opened, and the switches 92 and 93 are closed. When the switch 91 opens, the red light 97 is put out of circuit, thus indicating that atmosphere within the housing 11 is safe with respect to $CO_2$ content. When the switches 92 and 93 close, the 220-volt power lines 100 and 101 are connected to the transformer 16 that energizes the grids 15. Consequently, these grids 15 are energized only as soon as the atmosphere is safe from explosion.

As soon as the extinguishment of the red light indicates a safe atmosphere in the housing 11, the switch 53 may be closed, to start the divider motor 13, which then causes a feed of grain to the grid.

Under the circumstances thus far described, the density of carbon dioxide is at least at the safe minimum, here suggested as 34%. The particular density at which the switch arm 70 shifts to neutral is predetermined by the setting of the regulator 73. With the arm 70 in neutral, the main carbon dioxide valve 31 continues open. However, as the density of carbon dioxide builds up, accompanied by a further increase in pressure in the diaphragm chamber 68, it will reach a certain maximum value for this control. When this maximum value is obtained, the control arm 70 is thrown over to the dashed line position, where its magnet 75 attracts the blade 82 of the switch 78, thereby opening that switch. This immediately deenergizes the green light 96 and the main carbon dioxide valve 31, which latter closes. Thereafter the supply of carbon dioxide is only that admitted through the bypass solenoid valve.

Should the density of carbon dioxide within the housing 11 drop when the main solenoid valve is closed off, as it will normally do in due course of time, the pressure within the diaphragm chamber will decrease, and the arm 70 will move back to its neutral position, wherein both of the switches 77 and 78 are closed. When it does so, it releases the switch 78 to reclosed position, causing the main carbon dioxide valve to reopen and the green light to burn. Such condition may exist when the density of carbon dioxide descends from the 36% maximum to an intermediate value such as 35%. There is, of course, an inherent differential in switches of the type illustrated at 55, but this differential may be controlled by a suitable known means.

Thus, in normal operation at the start of the apparatus, the grids will not be energized until the carbon dioxide density attains a safe degree such as 34%. Thereafter, the grids will be energized, and the carbon dioxide content will continue to rise a slight amount that provides an operating range for the equipment. When the carbon dioxide content reaches a maximum value, the rate of inflow of carbon dioxide will be reduced to that provided through the bypass line, which is below that required to maintain the safe atmosphere. Thereafter, the apparatus will cause the charging of carbon dioxide to cycle within a small range, which range is above the minimum required for safety.

If at any time for any reason the density of carbon dioxide should drop below the safe density within the housing 11, the diaphragm 69 will fall and the switch blade 70 will move over to the switch 77, reopening the same, lighting the red lamp 97, and deenergizing the grid transformer 16 so that the grids 15 are deenergized and no sparking can possibly occur. The grids 15 will remain deenergized until the carbon dioxide content builds up again. The operator is warned by the presence of red light so that he may stop the divider motor by opening the switch 53 as necessary.

While this apparatus has been described in connection with the maintenance of proper density of carbon dioxide within a housing of an electrocuting device for insects, it will be understood that the control is capable of further and broader uses where it is necessary to maintain a density of gas automatically in some enclosure. Also, other individual features of the invention are capable of other uses as will be apparent. However, there is the particular objective of the invention to provide safety equipment of automatic characteristics for use in electrical machinery, and most particularly in an electrical insect killer of the type illustrated in the Stone patent.

What is claimed is:

1. In a machine for treating material in a housing with an electrical current, and for maintaining a non-explosive atmosphere in the housing: the combination of a housing as aforesaid; electrical means in the housing to receive and treat the material; feeding means to feed the material to the electrical means; intermittent gas supply means to supply a component of carbon dioxide gas to the housing to render the atmosphere therein non-explosive; a gas analyzer operable to indicate the density of said component in the housing; the analyzer being adapted to produce a pressure that varies with the density of the gas component in said atmosphere; a pressure-responsive switch mechanism having a first switch device, a second switch device, and a member moved by pressure changes produced by increasing density of the gas from a position to the first switch device, to a neutral position, and thence to a position to open the second switch device, both switch devices being adapted to close when not so operated; a control device, for rendering the electrical means operative, said control being connected with the first switch device, whereby said control device can cause operation of the electrical means only when the density attains a value to move the switch-operating member to neutral position; the gas supply means being connected with the second switch device, whereby it will be rendered inoperative only when the density attains a value to move the switch-operating member beyond neutral, to position for opening the second switch-operating device, and will be rendered operative again when density falls to return the switch-operating member to neutral.

2. In a machine for treating material in a housing with an electrical current, and for maintaining a non-explosive atmosphere in the housing: the combination of a housing as aforesaid; electrical means in the housing to receive and treat the material; feeding means to feed the material to the electrical means; intermittent gas supply means to supply a component of gas to the housing to render the atmosphere therein non-explosive; a gas analyzer operable to indicate the density of said component in the housing; the analyzer being adapted to produce a pressure that varies with the density of the gas component in said atmosphere; a pressure-responsive switch mechanism having a first switch device, a second switch device, and a member moved by pressure changes produced by increasing density of the gas from a position to the first switch device, to a neutral position, and thence to a position to open the second switch device, both switch devices being adapted to close when not so operated; a control device, for rendering the electrical means operative, said control being connected with the first switch device, whereby said control device can cause operation of the electrical means only when the density attains a value to move the switch-operating member to neutral position; the gas supply means being connected with the second switch device, whereby it will be rendered inoperative only when the density attains a value to move the switch-operating member beyond neutral, to position for opening the second switch-operating device, and will be rendered operative again when density falls to return the switch-operating member to neutral, and means to supply said gas component in predetermined constant amount to the housing.

3. An apparatus for electrocuting insects and the like in a stream of moving particles such as grain, and for providing a non-explosive atmosphere in the housing: a housing as aforesaid, electrical grid means in the housing, means to cause the stream of material to flow over the grid means; an inert gas supply means connected into the housing, a gas analyzer to determine the density of said inert gas in the housing and to operate a movable element as a function of variation in such density; a first control switch and a second control switch spaced from the first, said switches being normally closed, the movable element being adapted to open said switches when adjacent to them, and being movable, as density increases, from adjacent the first switch, to neutral, to adjacent the second switch; grid energization means connected through the first switch to produce grid energization only when the first switch is closed and hence only when increasing gas density has moved the switch element as far as neutral position; and the inert gas supply means being connected through the second control switch, whereby to deliver gas except when the switch element is beyond neutral position.

4. An apparatus for electrocuting insects and the like in a stream of moving particles such as grain, and for providing a non-explosive atmosphere in the housing: a housing as aforesaid, electrical grid means in the housing, means to cause the stream of material to flow over the grid means; carbon dioxide supply means connected into the housing, a gas analyzer to determine the density of carbon dioxide in the housing and to operate a movable element as a function of variation in such density; a first control switch and a second control switch spaced from the first, said switches being normally closed, the movable element being adapted to open said switches when adjacent to them, and being movable, as density increases, from adjacent the first switch, to neutral, to adjacent the second switch; grid energization means connected through the first switch to produce grid energization only when the first switch is closed and hence only when increasing gas density has moved the switch element as far as neutral position; and the gas supply means being connected through the second control switch, whereby to deliver gas except when the switch element is beyond neutral position, and indicating means operated through each of said control switches.

5. The combination of claim 3, with main control means operable to control all of the aforesaid mechanism; and with an additional supply means to supply a constant amount of inert gas to the housing, rendered operative upon operation of the main control means.

6. The combination of claim 5, wherein there is a pressure regulator for the inert gas, and there is a heater therefor that is rendered operative upon operation of the main control means, and said inert gas is carbon dioxide.

7. The combination of claim 5, wherein the gas analyzer has a gas flow means to deliver gas from the housing, which gas flow means is connected to be energized upon operation of the main control means.

8. In apparatus for delivering a gas into a housing: actuable means in the housing; a gas supply line leading into the housing; a valve in said line; electric means for opening and closing the valve; a gas analyzer connected into the casing and having means movable responsively to the amount of the gas in the atmosphere within the casing, the movable means being movable from first to second operating positions and also being disposable between those positions; the analyzer disposing the movable means in first position when the gas content is as great as a predetermined amount, in second position when the gas content is as low as a lower predetermined amount, and in mid position between the first and second positions when the gas content is between said predetermined amounts; first switch means operated by the movable means in first position to operate the electrical means to close the valve, second switch means operated by the movable means in second position to render the actuable means inoperative, the movable means in its mid position rendering the first switch operable to operate the electrical means to open the valve, and rendering the second switch operable to effect actuation of the actuatable means.

9. In a control for regulating delivery of carbon dioxide combustion suppressing gas to a casing: electrically operable apparatus in the casing; a conduit for delivering the gas to the casing; a sampling device, an electrically operated blower for discharging atmosphere from the casing through the sampling device; a relay having a coil and a switch, the switch being in circuit with the electrically operatable apparatus; an electrically operatable valve in the conduit; a first switch in circuit with the valve, a second switch in circuit with the relay coil; the sampling device including a member movable to position to open the first switch and to second position to open the second switch and to neutral wherein both switches are closed, and the sampling device also including operating means to move the member to first position when the amount of carbon dioxide gas in the casing is up to a predetermined amount, and then to second position as the amount of the carbon dioxide gas descends to a predetermined lower amount; and a main switch operable to start the blower, to put the first and second switches in circuit along with the valve and the relay coil, so that the valve and the relay coil may then be energized and deenergized as their switches complete or break the circuits in which they are included, the relay switch, when its coil is energized, closing a circuit to the electrical apparatus in the casing.

10. The combination of claim 9, wherein there is a second gas conduit into the casing, a valve therefor, and electrical means to open the valve, connected with the main switch to be energized to open the valve when the main switch is closed.

ERNEST KRETSCHMAR.

References Cited in the file of this patent

UNITED STATES PATENTS

| Number | Name | Date |
| --- | --- | --- |
| 1,638,104 | Roucka | Aug. 9, 1927 |
| 2,296,747 | Stover | Sept. 22, 1942 |
| 2,299,109 | Rand | Oct. 20, 1942 |
| 2,373,428 | Stone | Apr. 10, 1945 |
| 2,467,181 | Barnard et al. | Apr. 12, 1949 |
| 2,470,043 | Monsarrat | May 10, 1949 |

OTHER REFERENCES

"Gas Analysis and Testing of Gaseous Materials," by V. J. Altieri (1945), published by American Gas Association Inc., 420 Lexington Ave., New York, New York, pages 127 to 137.